(12) United States Patent
Potens et al.

(10) Patent No.: US 11,495,876 B2
(45) Date of Patent: Nov. 8, 2022

(54) MODULAR EYEWEAR ANTENNA ASSEMBLY

(71) Applicant: Meta Platforms, Inc., Menlo Park, CA (US)

(72) Inventors: Brandon Potens, San Jose, CA (US); Ce Zhang, Redmond, WA (US); Jennifer Davis-Wilson, Mountain View, CA (US); Andriy Pletenetskyy, Mountain View, CA (US); Bruno Cendon Martin, Palo Alto, CA (US); Geng Ye, San Jose, CA (US); Peter Eli Renner, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 136 days.

(21) Appl. No.: 17/068,319

(22) Filed: Oct. 12, 2020

(65) Prior Publication Data

US 2022/0115774 A1   Apr. 14, 2022

(51) Int. Cl.
*H01Q 1/27* (2006.01)
*H01Q 9/28* (2006.01)

(52) U.S. Cl.
CPC ............ *H01Q 1/273* (2013.01); *H01Q 9/285* (2013.01)

(58) Field of Classification Search
CPC ............ A61K 31/5415; C12Q 1/6886; C12Q 2600/106; C12Q 2600/118; C12Q 2600/158; G02C 11/10; H01Q 1/273; H01Q 1/48; H01Q 5/342; H01Q 9/0421; H01Q 9/285; G16B 20/00; G16B 25/10; G16B 40/10; G16B 40/20
See application file for complete search history.

(56) References Cited

U.S. PATENT DOCUMENTS 5,020,150 A   5/1991   Shannon
8,337,014 B2  12/2012  Kokonaski et al.
(Continued)

FOREIGN PATENT DOCUMENTS

KR   20060068741 A   6/2006

OTHER PUBLICATIONS

International Search Report and Written Opinion for International Application No. PCT/US2021/054342, dated Jan. 24, 2022, 11 pages.

*Primary Examiner* — Thien M Le
(74) *Attorney, Agent, or Firm* — Foley & Lardner LLP

(57) ABSTRACT

Apparatuses, methods, and systems for a modular eyewear antenna assembly, are disclosed. One modular eyewear antenna assembly includes an eyewear housing including a front frame and a pair of eyewear temple arms, wherein a physical size and shape of each of the temple arms is selectable from a plurality eyewear assembly SKU sizes and shapes, a printed circuit board (PCB) including a controller and a radio, wherein the PCB extends along at least one of the temple arms, wherein the PCB has a fixed size that is adapted for placement within one of the temple arms, and a modular antenna structure including a planar antenna, wherein the modular antenna structure interfaces with the PCB for providing a wireless propagation path for the radio, wherein the modular antenna structure has a fixed size that is adapted for placement along with the PCB within one of the temple arms.

19 Claims, 9 Drawing Sheets

(56) References Cited

U.S. PATENT DOCUMENTS

| | | | |
|---|---|---|---|
| 8,624,787 B2* | 1/2014 | Druyan | H01Q 9/26 |
| | | | 343/718 |
| 8,708,483 B2 | 4/2014 | Kokonaski et al. | |
| 2007/0008484 A1 | 1/2007 | Jannard | |
| 2018/0212314 A1* | 7/2018 | Rautio | G02C 5/22 |
| 2019/0011699 A1* | 1/2019 | Moore | G02B 27/0172 |
| 2019/0033622 A1* | 1/2019 | Olgun | G06Q 20/321 |
| 2019/0113774 A1* | 4/2019 | Anderson | G02C 5/143 |
| 2019/0196228 A1* | 6/2019 | Moore | G02B 27/0176 |
| 2019/0198983 A1* | 6/2019 | Moore | G02B 27/0176 |
| 2019/0229395 A1* | 7/2019 | Hintermann | G06F 1/1698 |
| 2020/0119433 A1* | 4/2020 | Ash | H01Q 1/02 |

* cited by examiner

MODULAR EYEWEAR ANTENNA ASSEMBLY

FIELD OF THE DESCRIBED EMBODIMENTS

The described embodiments relate generally to eyewear. More particularly, the described embodiments relate to systems, methods and apparatuses for modular antennas for electronic eyewear.

BACKGROUND

For electronic eyewear, generally, multiple sizes and multiple shapes of electronic eyewear requires different antenna designs and configurations. Additionally, if sold in the consumer electronic space, the volumes of the eye wear can scale up to millions of units of the electronic eyewear with only one or two antenna configurations.

Smart glasses (electronic eyewear) that includes an antenna require customized designs based on industrial design and mechanical constrains. Designing different antenna for each size and shape of the electronic eyewear leads to a much longer product development cycle, and adds engineering and manufacturing costs.

Further, electronic eyewear, including augmented reality of virtual reality eyewear typically include radio frequency (RF) circuitry in the proximity of head of a user of the eyewear for supporting wireless connectivity to the eyewear. In this situation, a portion of RF energy can be radiated towards the head of the user which will be absorbed by the head of the user. Radiation of RF energy towards the head of the user is undesirable for a couple of reasons. First, radiation towards the head of the user means less RF energy being transmitted to a RF receiver (for example, mobile phone, WiFi access point (WiFi router), and base station). Second, according to FCC (federal communication commission) regulations, RF radiation towards the head of the user is to be limited to a selected threshold.

It is desirable to have methods apparatuses, and systems for modular antennas for electronic eyewear.

SUMMARY

An embodiment includes a modular eyewear antenna assembly. The modular eyewear antenna assembly includes an eyewear housing comprising a front frame and a pair of eyewear temple arms, wherein a physical size and shape of each of the temple arms is selectable from a plurality eyewear assembly SKU sizes and shapes, a printed circuit board (PCB) comprising a controller and a radio, wherein the PCB extends along at least one of the temple arms, wherein the PCB has a fixed size that is adapted for placement within the at least one of the temple arms for each of the eyewear assembly SKU sizes and shapes, and a modular antenna structure comprising a planar antenna, wherein the modular antenna structure interfaces with the PCB for providing a wireless propagation path for the radio to an external wireless device, wherein the modular antenna structure has a fixed size that is adapted for placement along with the PCB within the at least one of the temple arms for each of the eyewear assembly SKU sizes and shapes.

An embodiment includes a modular eyewear antenna assembly. The modular eyewear assembly includes an eyewear housing, a printed circuit board, and a modular antenna structure. The eyewear housing includes a front frame and a pair of eyewear temple arms. The printed circuit board (PCB) includes a controller and a radio, wherein the PCB extends along at least one of the temple arms. The antenna structure interfaces with the PCB for providing a wireless propagation path for the radio. The modular antenna structure further includes a conductive patch formed on a first surface of the modular antenna structure, a conductive side wall that extends through the modular antenna structure, a ground plane formed on a second surface of the modular antenna structure, and a feeding trace located on the first surface which is capacitively coupled to an RFIC (radio frequency integrated circuit) of the PCB, wherein the conductive patch, the conductive sidewall, the ground plane, and the feeding trace form a planar inverted-F antenna.

Another embodiment includes a method of assembling the modular antenna structure of an electronic eyewear. The method includes forming mechanical holes and alignment features on a PCB that includes a controller and an RFIC, soldering a plurality of spring clips onto both a top (first) and a bottom (second) surface of the PCB before assembly, inserting the PCB into a mechanical slot of modular antenna structure, wherein the mechanical holes of the PCB lock in with ribs of the mechanical slot of the modular antenna structure, providing alignment of the plurality of spring clips of the PCB with conductive pads of the modular antenna structure, wherein when inserting the PCB along the mechanical slot, tips of the plurality of spring clips are deformed ensuring equilibrium of force on the PCB, and placing the PCB and the modular antenna structure within the curved temple arm of multiple shape and SKU sizes of an electronic eyewear.

Other aspects and advantages of the described embodiments will become apparent from the following detailed description, taken in conjunction with the accompanying drawings, illustrating by way of example the principles of the described embodiments.

DETAILED DESCRIPTION

Figure 1:
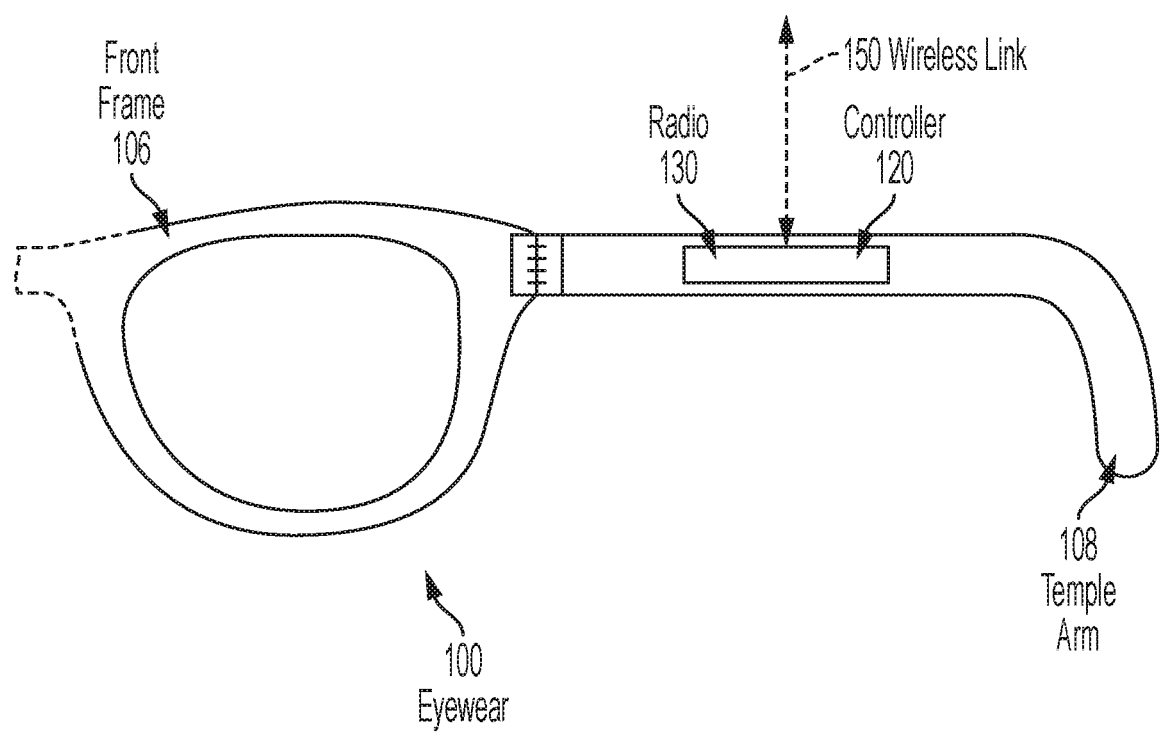
FIG. 1 shows electronic eyewear, according to an embodiment.

The embodiments described include methods, apparatuses, and systems for modular antennas for electronic eyewear. For an embodiment, the eyewear includes an eyewear housing, a printed circuit board (PCB), and a modular antenna structure. For an embodiment, the eyewear housing is selectable from a plurality eyewear assembly SKU sizes and shapes. That is, the shape and size of the eyewear housing can vary from one electronic eyewear to another. However, the size and shape of the PCB and the modular antenna structure are configured to be the same for the variable different shapes and size of the eyewear housing. For an embodiment, the printed circuit board (PCB) includes a controller and a radio, wherein when assembled, the PCB extends along at least one of the temple arms, and the PCB has a fixed size that is adapted for placement within one of the temple arms for each of the eyewear assembly SKU sizes and shapes. For an embodiment, the modular antenna structure includes a planar antenna, wherein the modular antenna structure interfaces with the PCB for providing a wireless propagation path for the radio to an external wireless device. Further, the modular antenna structure has a fixed size that is adapted for placement along with the PCB within the at least one of the temple arms for each of the eyewear assembly SKU sizes and shapes.

The design of electronic eyewear, such as, augmented reality (AR) glasses is very critical to the popularity of the electronic eyewear in the consumer electronics market. Generally, the front frame of the glasses is dedicated to style and fashion rather than to functionality of the eyewear. At least some embodiments include dedicating the frame of the eyewear to curvy and fashion design, and dedicating the one or more temple arms of the electronic eyewear to housing electronic circuitry and/or housing a battery.

Typically, consumer electronic products scale up volume to millions of units with one or two antenna configurations. The booming smart eyewear and AR (augmented reality) industry has different scaling strategy. That is, one product has more than 10 SKU sizes & stylish shapes to meet different customer needs. Smart glasses antenna requires customized design based on ID (industrial design) and mechanical constrains. Designing different antenna for each size and shape leads to a much longer product development cycle, and adds engineering and manufacturing costs.

Further, AR glasses have radio frequency circuitry in the proximity of head for wireless connectivity. In this case, the portion RF energy radiated towards head will be absorbed by human head. The more radiation towards head, the less RF energy can be transmitted to the RF receiver (that is, mobile phones, WiFi access points (WiFi router), and base stations). Further, according to FCC regulation, if the radiation towards head is above certain limit, RF circuitry must reduce the transmit power delivered to antenna and therefore reduce its radiation for conformance. When the transmit power is too low, the received power at receiver cannot sustain high throughput wireless connection.

For an embodiment, a Planar Inverted-F antenna (PIFA) is utilized as a solution to mitigate head effect as it has a directional radiation with a null radiation towards human head side. As radiation towards the head is minimized, the SAR (Specific Absorption Rate) is improved for better RF safety and more transmit power is provided.

At least some of the described embodiments include modular antenna structures to enable one antenna design for all the sizes and shapes of an eyewear/AR product. Further, at least some of the described embodiments are configured to mitigate the RF radiation toward heads without affecting the quality of a wireless connection between the electronic eyewear and an external device.

FIG. 1 shows electronic eyewear 100, according to an embodiment. As shown, the electronic eyewear 100 includes a front frame 106, and a temple arm 108. Though a single temple arm 108 is shown, clearly an embodiment of the electronic eyewear includes a pair of temple arms.

As shown, for an embodiment, the temple arm 108 includes a controller 120, and a radio 130 that operates to form a wireless link with an external device. The described embodiments include a PCB (printed circuit board) and modular antenna that are adapted for configuration within the temple arm 108. For an embodiment, the PCB includes the controller 120 and the radio 130. For an embodiment, the modular antenna of the described embodiments is configured to form an antenna for the radio 130 which supports a wireless link 150 between the electronic eyewear 100 and an external wireless device.

Figure 2:
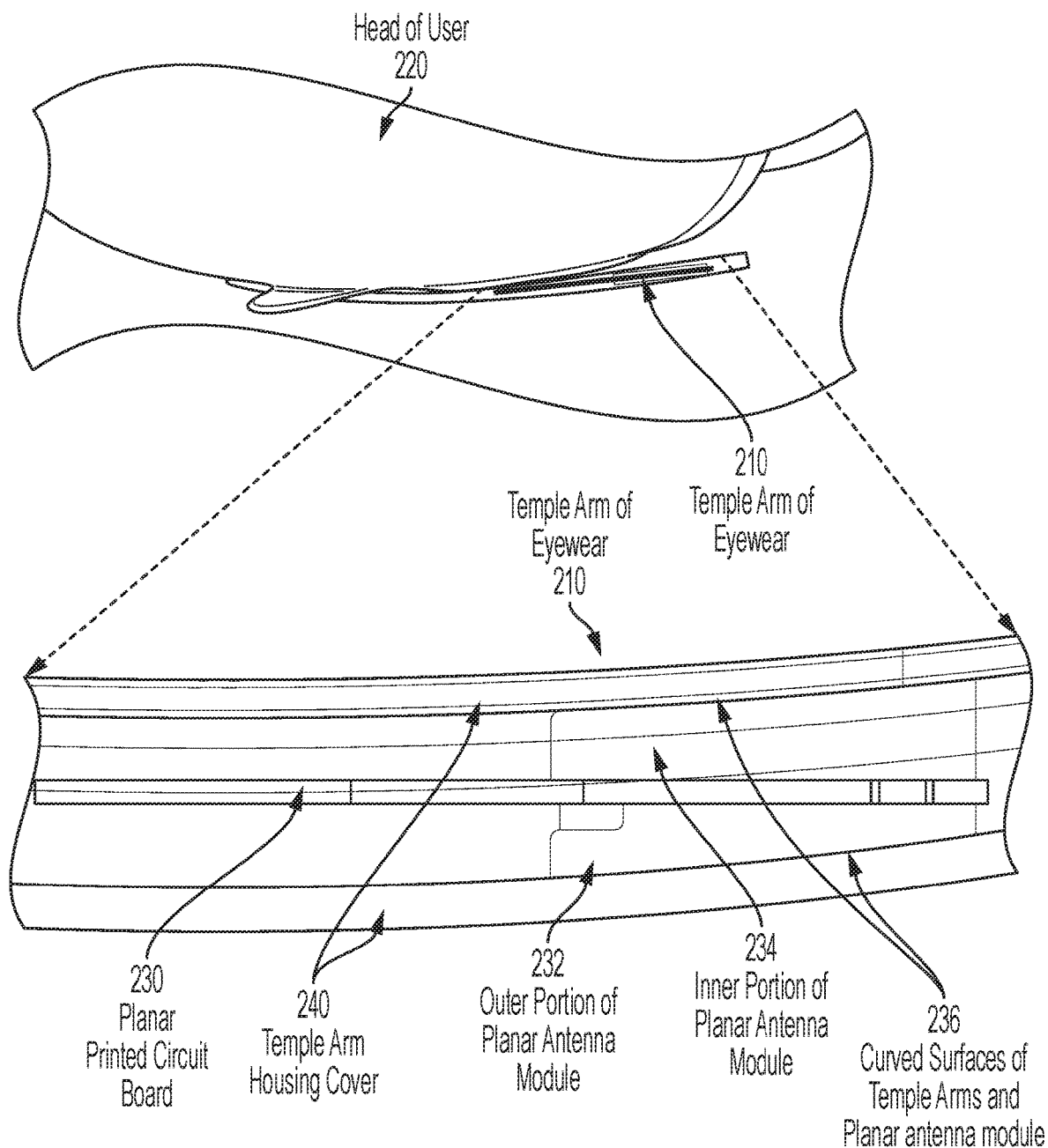
FIG. 2 shows a temple arm of eyewear that includes a modular antenna, according to an embodiment.

FIG. 2 shows a temple arm 210 of eyewear that includes a modular antenna, according to an embodiment. As shown, the temple arm 210 is curved to enable the eyewear of the temple arm 210 to fit a head of a user 220 of the electronic eyewear. At least some embodiments of the electronic eyewear include a modular eyewear assembly (PCB and modular antenna) that is configured to be placed within the curved temple arm of multiple shape and SKU sizes of the electronic eyewear.

As shown in FIG. 2, for an embodiment, the modular eyewear antenna assembly includes an eyewear housing, a printed circuit board (PCB) 230, and a modular antenna structure. For an embodiment, the eyewear housing includes a front frame and a pair of eyewear temple arms (210), wherein a physical size and shape of the temple arms is selectable from a plurality eyewear assembly SKU sizes and shapes. That is, the eyewear housing is selectable from a plurality eyewear assembly SKU sizes and shapes, and therefore, each of the temple arms is selectable from a plurality eyewear assembly SKU sizes and shapes.

As previously described, for an embodiment, printed circuit board (PCB) 230 includes at least a controller and a radio. Further, for an embodiment, the PCB 230 extends along at least one of the temple arms 210, wherein the PCB 230 has a fixed size that is adapted for placement within the at least one of the temple arms 210 for each of the eyewear assembly SKU sizes and shapes.

For at least some embodiments, the modular antenna structure includes a planar antenna, wherein the modular antenna structure interfaces with the PCB 230 for providing a wireless propagation path (such as, the wireless link 150) for the radio to an external wireless device. As previously stated, for an embodiment, the modular antenna structure has a fixed size that is adapted for placement along with the PCB within the at least one of the temple arms for each of the eyewear assembly SKU sizes and shapes. That is, the eyewear assembly can have multiple sizes and shapes, whereas the PCB and the modular antenna structure are fixed in size.

The term "Sku" (pronounced "skew"), is short for stock keeping unit, is used by retailers to identify and track its inventory, or stock. A SKU is a unique code consisting of letters and numbers that identify characteristics about each product, such as manufacturer, brand, style, color, and size.

For an embodiment, the modular antenna structure includes a first portion (outer portion located away from the head of the user 220) 232 and a second portion (inner portion located proximate to the head of the user 220) 234, wherein the PCB 230 is sandwiched between the first portion 232 and the second portion 234 when assembled within the temple arm 210. As shown, the temple arm includes curved surfaces 236 to make the eyewear adapted for placement on the head of the user 220. For an embodiment, the PCB 230 includes a planar structure. Specifically, the PCB 230 is planar, and includes a rigid structure that must fit or be placed within the temple arm 210 that is curved according to the surfaces 236. Accordingly, for an embodiment, both the inner portion 232 and the outer portion 232 of the modular antenna structure include curved surfaces adapted for placement between the planar PCB 230 and a curved surface of a housing cover 240 of the at least one of the temple arms 210 for each of the eyewear assembly SKU sizes and shapes.

For an embodiment, the curved surfaces of the modular antenna structure conform to curved surfaces 236 of the temple arm housing cover 240 of the temple arm 210. By maintaining the curved surfaces, a volume of an antenna formed by the modular antenna structure is allowed to be large enough that the formed antenna is operable to support radiation of electromagnetic signals having a required frequency channel bandwidth. That is, a desired or required frequency channel bandwidth of communication signals transmitted between the antenna of the modular antenna structure of the electronic eyewear and an external wireless device requires the antenna be formed with a great enough volume to provide a desired level of antenna gain. The curved surfaces 234 of the planar antenna module allows for the needed volume while still accommodating the rigid planar structure of the PCB 230.

That is, for an embodiment, the modular antenna structure has curved surfaces conforming to the inner surface 236 (surface closest to a head of a user of the electronic eyewear) of temple arm 210, so that the antenna volume can be maximally utilized in 3-dimension. The larger antenna volume results in better antenna performance, especially for a planar inverted-F antenna (PIFA). For the PIFA topology, it is very challenging to meet the needed frequency channel bandwidth requirement if the antenna volume is not well utilized.

Figure 3:
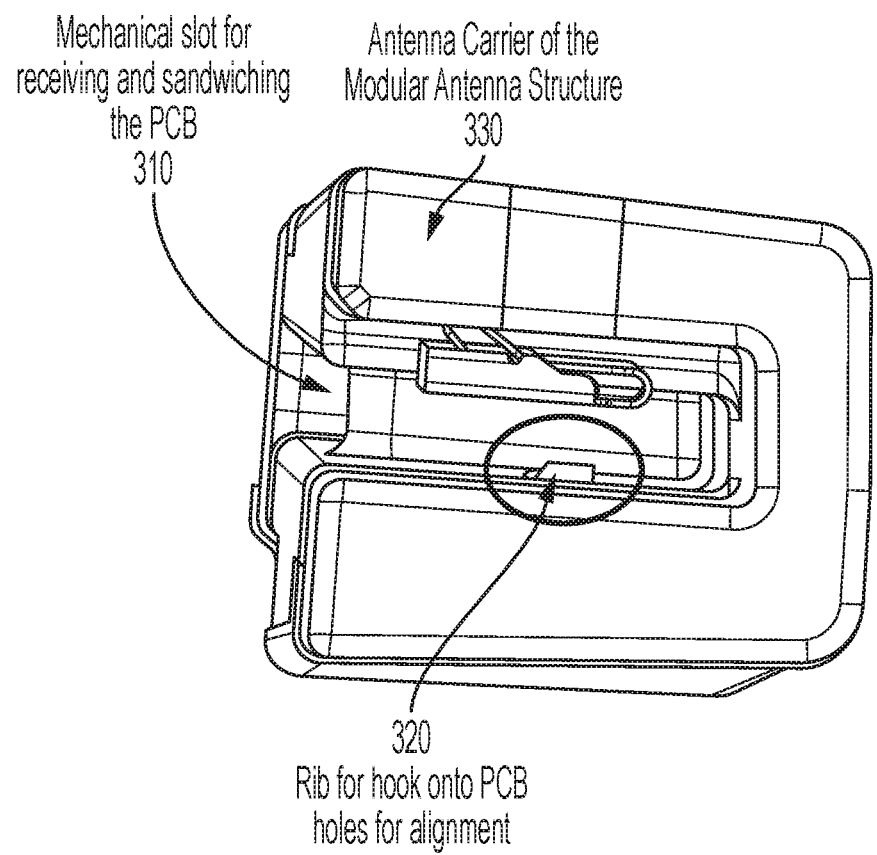
FIG. 3 shows a modular antenna that includes a mechanical slot that includes a rib for receiving a PCB (printed circuit board), according to an embodiment.

FIG. 3 shows a modular antenna structure that includes a that includes a rib 320 for receiving a PCB (printed circuit board), according to an embodiment. For an embodiment, the modular antenna structure includes an antenna carrier 330 that includes a mechanical slot 310 formed between the outer portion and the inner portion of the modular antenna structure, wherein the mechanical slot 310 is adapted to receive the PCB. For an embodiment, the modular antenna structure includes a plastic antenna carrier 330, and a conductive copper traces, wherein the conductive copper traces is plated on the surface of the plastic antenna carrier 330

For an embodiment, the mechanical slot 310 forms a sandwich-shaped mechanical structure, wherein a width of the mechanical slot 310 is dimensioned to accommodate and provide a fit of a tilt of the PCB along with spring clips located on both sides of the PCB. As will be described, several conductive clips provide electrical connections between the PCB and the modular antenna structure. For an embodiment, at least some of the conductive clips are soldered to the PCB before the PCB is inserted into the mechanical slot 310. Further, as previously described, the PCB may have a slanted physical relationship with the temple arm of the electronic eyewear due to the conforming shape of the temple and the rigid planar structure of the PCB. Accordingly, as stated, for an embodiment, the mechanical slot 310 is dimensioned (at least width) to receive the PCB with the conductive clips attached to the PCB. Further, the mechanical slot 310 is dimensioned (at least a width of the mechanical slot) to receive the PCB with a slant of the PCB relative to the modular antenna structure.

For an embodiment, the mechanical slot 310 formed between the outer portion and the inner portion of the modular antenna structure includes a rib 320 operative to hook the PCB upon receiving the PCB into the mechanical slot. The rib 320 operates to hold the PCB in place after the PCB is inserted into the mechanical slot 310.

Figure 4:
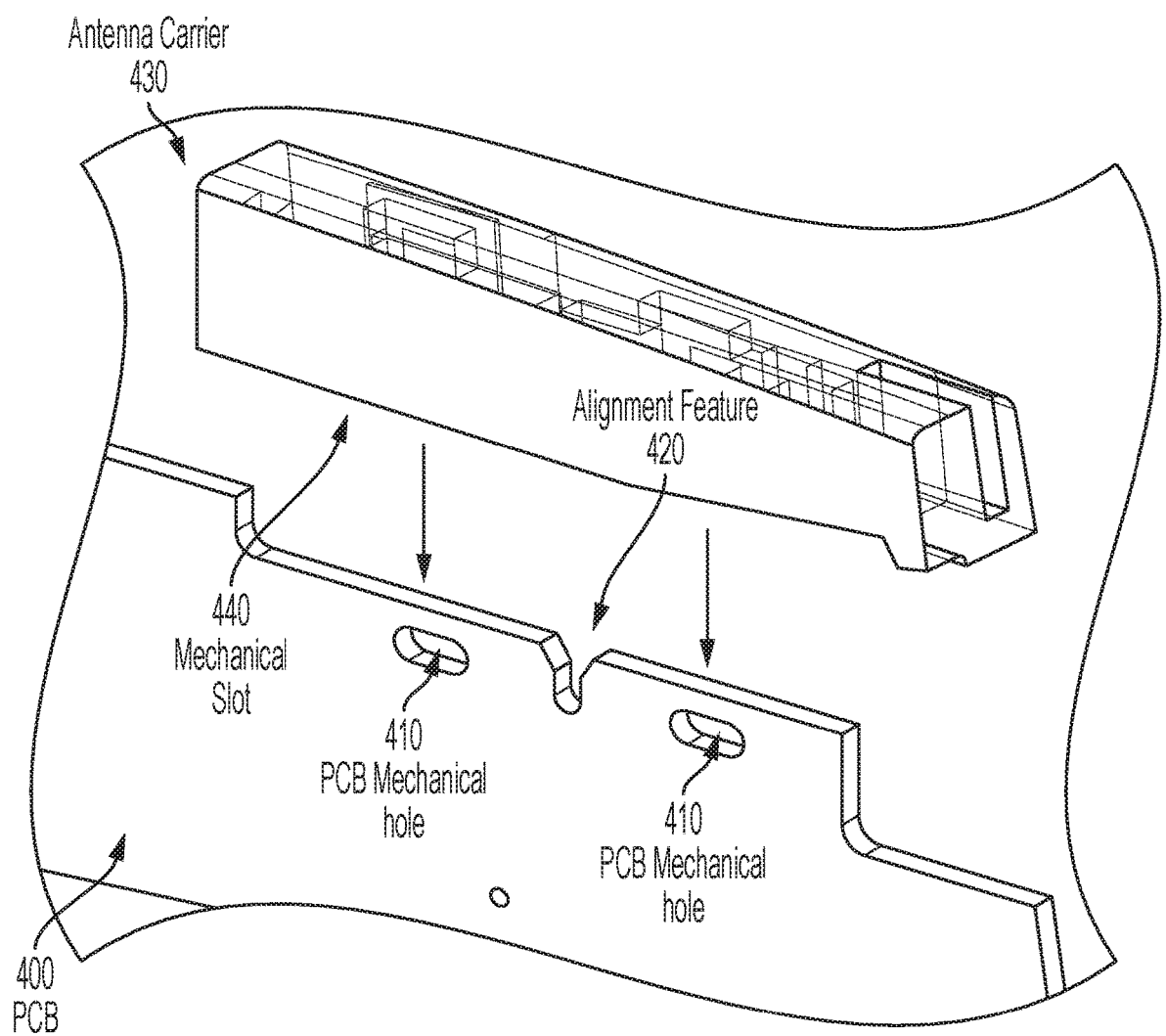
FIG. 4 shows a PCB that includes mechanical holes and alignment features for aiding alignment of the PCB with the modular antenna structure, according to an embodiment.

FIG. 4 shows a PCB 400 that includes mechanical holes 410 and alignment features 420 for aiding alignment of the PCB 400 with the modular antenna structure, according to an embodiment. For an embodiment, the PCB 400 includes one or more mechanical holes 410 for aligning the modular antenna structure with the PCB 400, wherein the mechanical holes lock in with the ribs of the planar antenna module (antenna carrier 430), providing alignment of a plurality of spring clips of one of the PCB 400 and the planar antenna module (antenna carrier 430) with conductive pads of the other of the PCB 400 and the planar antenna module (antenna carrier 430). For an embodiment, the mechanical holes 410 lock with the ribs on the antenna module 430 during the assembly process. For an embodiment, there are five clips (described later) on PCB 400 touching the small conductive pads on the antenna module 430 after assembly. Accurate alignment of spring clip and contact pads is achieved by this mechanical structure and mechanism during the process of assembly.

For an embodiment, the plurality of spring clips is soldered onto both a top and a bottom surface of the PCB before assembly, wherein when assembled by inserting the PCB along the mechanical slot 440, tips of the plurality of spring clips are deformed ensuring equilibrium of force on the PCB 400. For an embodiment, before the assembly of modular antenna, the tips of spring clips, which are soldered on top and bottom of PCB 400 through SMT (surface mount technology) process, are erected with larger height than when assembled. When the modular antenna is assembled onto the PCB 400 along the mechanical slot 440 on the antenna carrier 430, the tips of spring clips deform to ensure a larger contact area with contact pads on the antenna carrier 430. After assembly, the mechanical structures of the mechanical slot, the mechanical holes 410, the alignment features 420, and the deformed spring clips on top and bottom of PCB 400 ensures the equilibrium force at the PCB 400.

Figure 5:
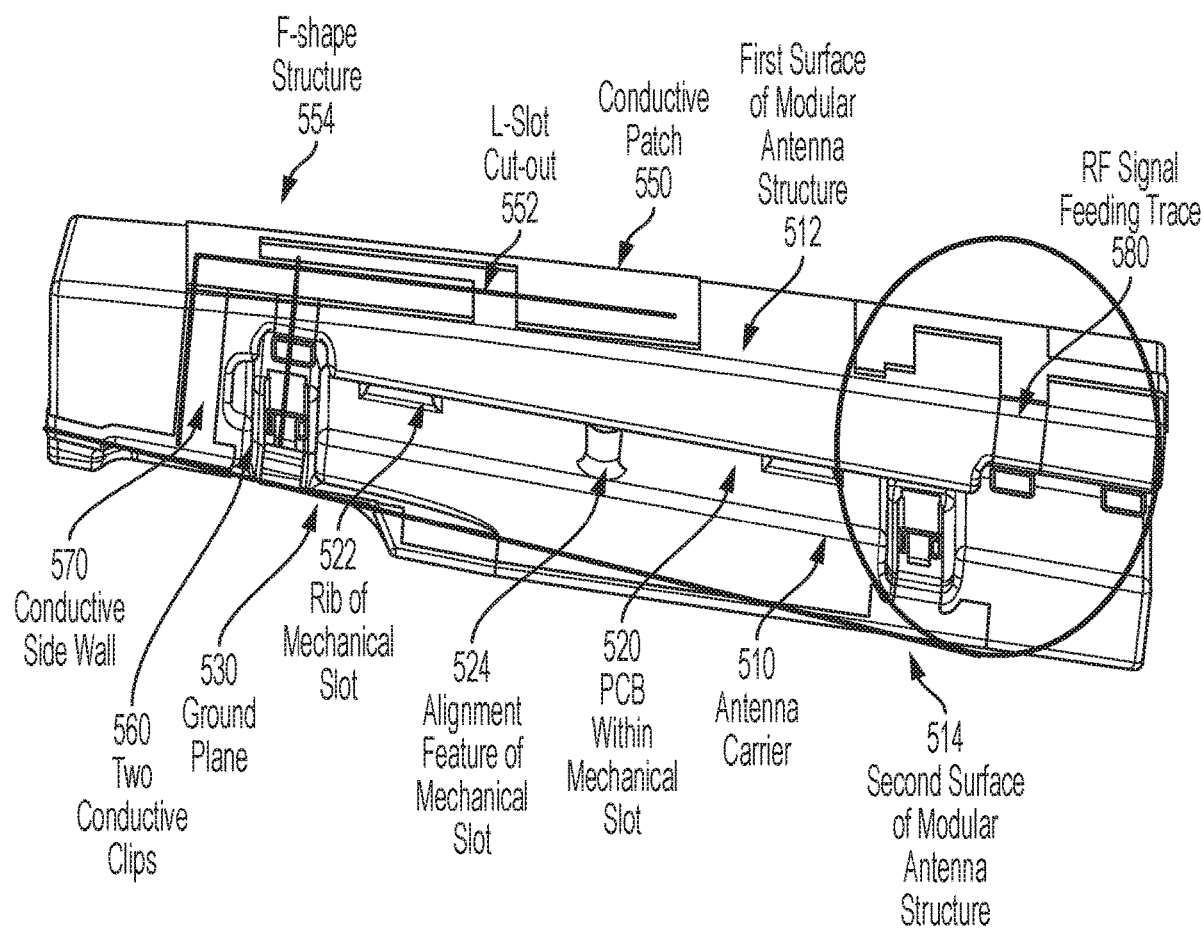
FIG. 5 shows a structure of a modular antenna, according to an embodiment.

FIG. 5 shows a structure of a modular antenna, according to an embodiment. For an embodiment, the modular antenna structure forms a planar inverted-F antenna which is configured to generate an antenna pattern having a null radiation pattern in a direction of a head of a user of the eyewear housing. That is, the planar inverted-F antenna is formed so that when the electronic eyewear is communicating with another device, electromagnetic radiation of the planar inverted-F antenna is directed away for the head of a user of the electronic eyewear.

An inverted-F antenna is a type of antenna used in wireless communication. It consists of a monopole antenna running parallel to a ground plane and grounded at one end. The antenna is fed from an intermediate point a distance from the grounded end. The inverted-F antenna is resonant at a quarter-wavelength (thus reducing the required space needed on a device utilizing the inverted-F antenna), and also typically has good SAR (specific absorption rate) properties.

The planar inverted-F antenna of the described embodiments is uniquely different in that an RF (radio frequency) signal of a radio of an RFIC (radio frequency integrated circuit) is coupled to the planar inverted-F antenna. More specifically, for an embodiment, the RF signal of the RFIC of the PCB 520 is capacitively coupled to the inverted F-shape antenna of the modular antenna structure. The planar inverted-F antenna is terminated on the PCB 520 with a reactive capacitance. That is, the planar inverted-F antenna is not directly fed by the RF signal from the PCB 520. Instead, the planar inverted-F antenna is terminated with a reactive SMT (surface mount technology) capacitor on the PCB 520.

For at least some embodiments, the modular antenna structure includes a conductive patch 550 formed on a first surface 512 of the antenna carrier 510 of the modular antenna structure, a conductive side wall 570 (along a side all of the antenna carrier 510) that extends through the modular antenna structure, a ground plane 530 formed on a second surface 514 of the modular antenna structure, and a feeding trace 580 located on the first surface 512 which is capacitively coupled to an RFIC (radio frequency integrated circuit) of the PCB 520, wherein the conductive patch 550, the conductive sidewall 570, the ground plane 530, and the feeding trace 580 form an F-shaped structure 554 the planar inverted-F antenna.

As shown in FIG. 5, conductive patch 550, the conductive side wall 570, along with a pair (two) conductive clips 560 form the F-shaped structure 554 of the planar inverted-F antenna. For an embodiment, the conductive patch 550 is plated on a conforming (first) surface 512 of the antenna carrier of the modular antenna structure. As previously stated, different from a possible conventional planar inverted-F antenna, the RF signal is not directly fed to spring clips in the "F" shape structure. The RF signal connected to the feeding trace 580, which is capacitively coupled to the planar inverted-F antenna structure.

For at least some embodiments, the conductive patch 550 includes an L-shaped cutout 552 that allows for a reduced size of conductive patch 550, thereby allowing for a reduction in a size of the planar inverted-F antenna. The reduced size provide flexibility in the design.

FIG. 5 additionally shows a rib 522 and an alignment feature 524 of the mechanical slot of the antenna carrier 510. As previously described, the rib 522 and the alignment feature 524 are used to align conductive springs with conductive pads when the PCB 520 is inserted into the mechanical slot of the antenna carrier when assembled.

Figure 6:
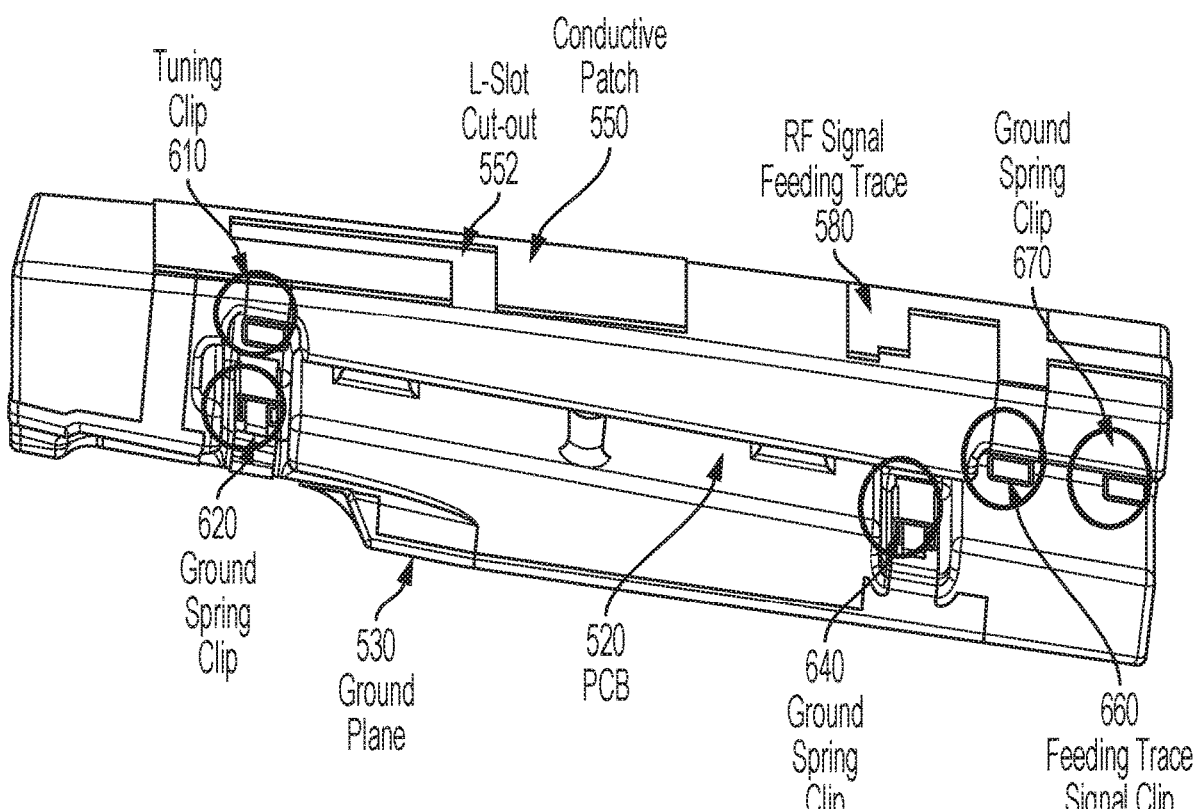
FIG. 6 shows a PCB and a modular antenna that are electrically connected using conductive clips, according to an embodiment.

FIG. 6 shows a PCB 520 and a modular antenna structure that are electrically connected using conductive clips, according to an embodiment. For at least some embodiments, the planar inverted-F antenna is connected to a ground plane through two conductive clips (tuning clip 610, ground spring clip 620, wherein the two conductive clips create ground shielding that reduces radiation to a head of a user of the modular eyewear antenna assembly.

For an embodiment, the conductive tuning clip 610 operates to electrically connect the radio of the PCB 520 to the conductive patch on the first surface of the antenna carrier of the modular antenna structure. For an embodiment, the tuning clip 620 tunes a lower frequency band of electromagnetic signals radiating from the planar inverted-F antenna.

For an embodiment, ground spring clips 620, 640, 670 operate to form communication modes of the electronic eyewear. That is, the ground spring clips 620, 640, 670 form communication channels that are used by the electronic eyewear to form wireless communication channels for communicating with external wireless devices.

That is, for an embodiment, the planar inverted-F antenna operates to form at least three communication modes, wherein each of the three communication modes support wireless communication through the planar inverted-F antenna. For an embodiment, a frequency response of the first mode is selected based on the conductive patch 550, the conductive ground 530, the tuning clip 610, a first ground spring clip 620 between the PCB 520 and the conductive ground 530 located proximate to the tuning clip 610, and a second spring clip 640 between the PCB 520 and the conductive ground 530 located proximate to a feeding trace signal clip 660.

A point of novelty of the modular antenna structure is operation of the bottom ground plane 530 at high frequency band of wireless communication. Operationally there are two modes in high band (Mode 2 and Mode 3) due to the careful placement of ground clips 620, 640, 670. Generally, the frequency response of the mode 2 is determined by the conductive ground 530 on the bottom (second surface) of the modular carrier, and the 3 ground clips (first ground spring clip 620, second spring clip 640, a third ground spring clip 670 electrically connected a conductive trace located on a sidewall of the antenna carrier 510). All three of the ground clips (first ground spring clip 620, second spring clip 640, third ground spring clip 670) are connected to the ground plane on the PCB 520. Generally, the frequency response of the mode 3 is created the feeding trace 580, a feeding trace signal clip 660, and GND clips on the top of PCB 520. Both Mode 2 and Mode 3 operating as low-quality factor (Q-factor) modes with wide frequency bandwidth coverage. Specifically, for an embodiment, a frequency response of the second mode is selected based on the conductive ground 530, the first ground spring clip 620, and the second spring clip 640. Specifically, for an embodiment, a frequency response of the third mode is selected based on the conductive feeding trace 580, the third ground spring clip 670, and the feeding trace signal clip which electrically connects the RFIC to the feeding trace signal clip 660.

Figure 7:
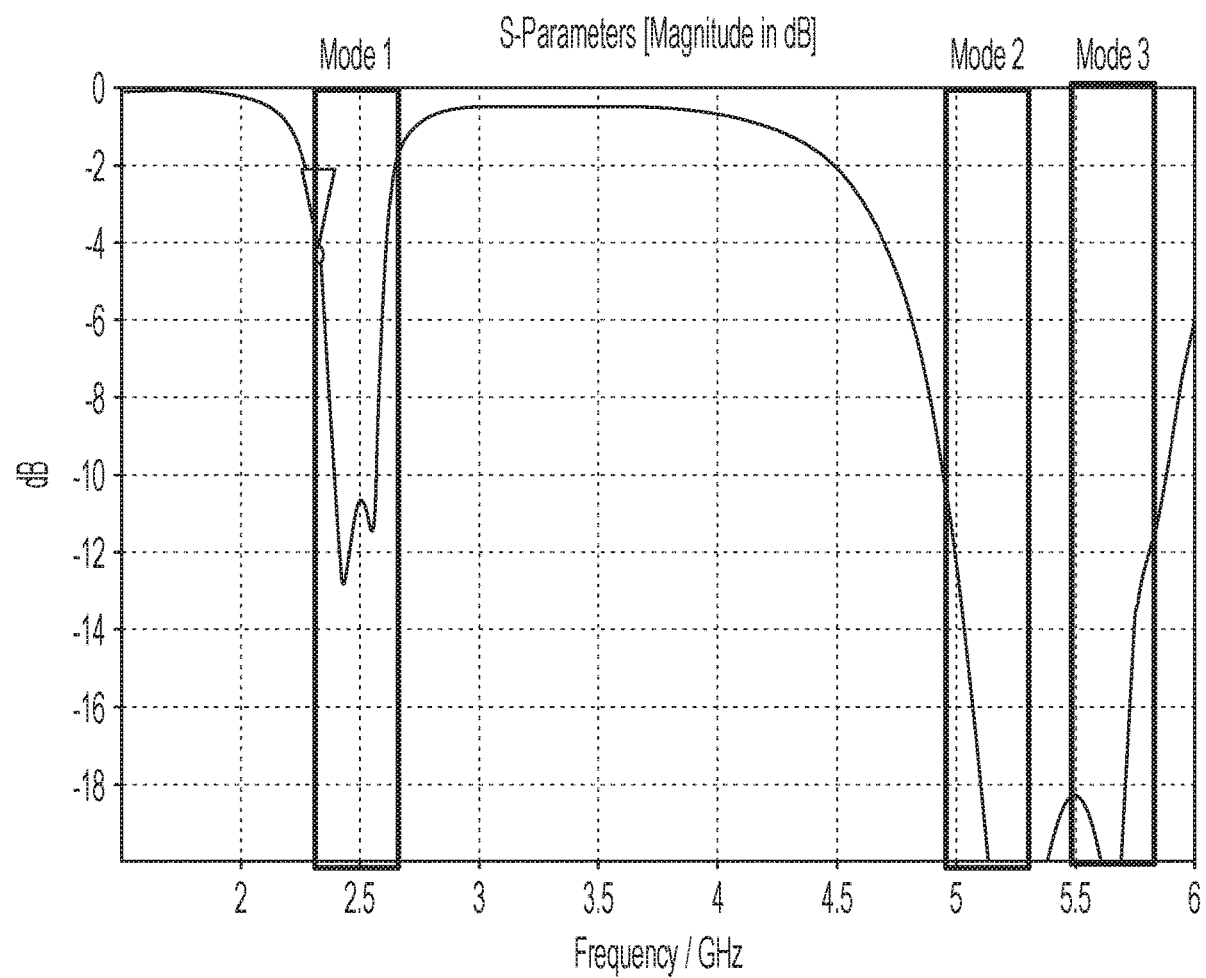
FIG. 7 shows a frequency response of three modes of wireless communication of the electronic eyewear, according to an embodiment.

FIG. 7 shows a frequency response of three modes of wireless communication of the electronic eyewear, according to an embodiment. That is, the three modes set by the features of the modular antenna structure of FIG. 6 are shown in FIG. 7. The frequency response of a channel of the first mode of operation of the electronic eyewear is centered at approximately 2.5 GHz with a frequency bandwidth of approximately 500 MHz. The frequency response of a channel of the second mode of operation of the electronic eyewear is centered at approximately 5.1 GHz a frequency bandwidth of approximately 500 MHz. The frequency response of a channel of the third mode of operation of the electronic eyewear is centered at approximately 5.7 GHz a frequency bandwidth of approximately 500 MHz.

Figure 8:
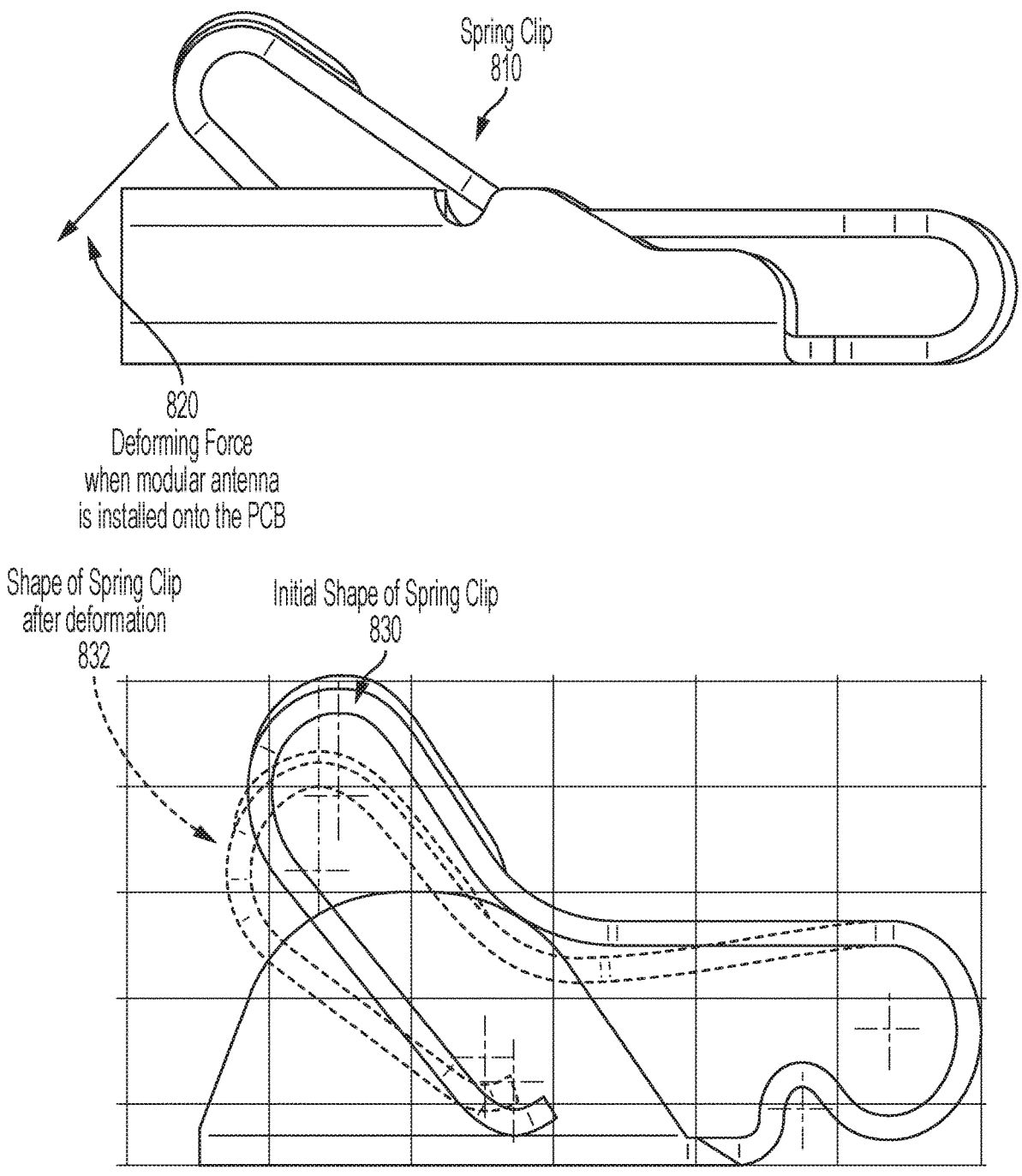
FIG. 8 shows a spring clip, according to an embodiment.

FIG. 8 shows a spring clip 810, according to an embodiment. The spring clip 810 has an initial shape 830 before being deformed when the modular antenna structure is installed onto the PCB. That is, as previously described, the PCB is inserted into the mechanical slot of the antenna carrier of the modular antenna structure. Upon insertion of the PCB into the mechanical slot, a deforming force 820 applied to the spring clip 810 deforms the spring clip 810 causing the deformed shape 832 of the spring clip 810. That is, a tip of the spring clip 810 is deformed after the modular antenna is installed onto the PCB. The deformation leads to larger contact area between conductive pads on the antenna carrier and the spring clip and ensures a good electrical conduction.

Figure 9:
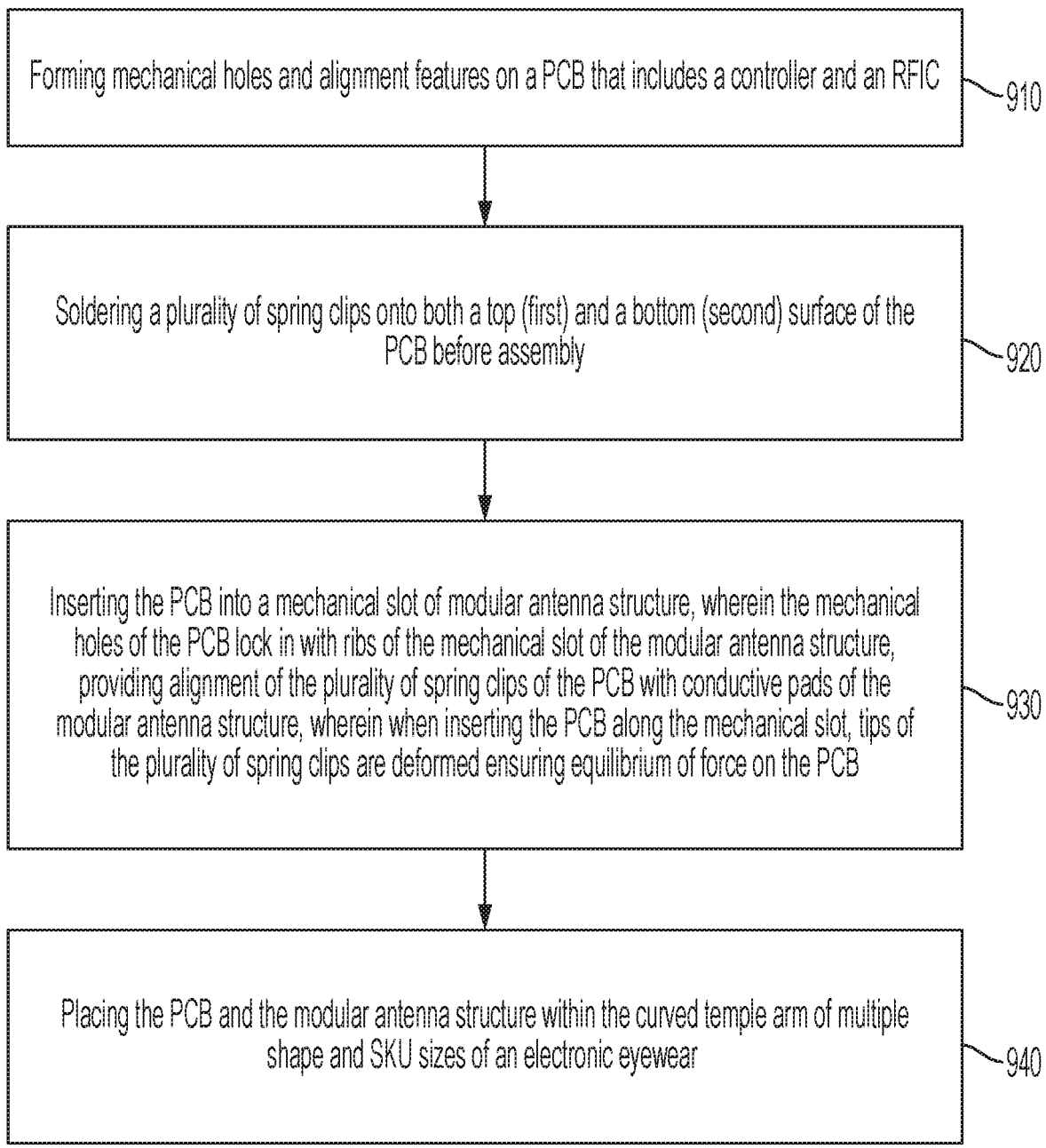
FIG. 9 shows is a flow chart that includes steps of a method of assembling the modular antenna structure of an electronic eyewear, according to an embodiment.

FIG. 9 shows is a flow chart that includes steps of a method of assembling the modular antenna structure of an electronic eyewear, according to an embodiment. A first step 910 includes forming mechanical holes and alignment features on a PCB that includes a controller and an RFIC. A second step 920 include soldering a plurality of spring clips onto both a top (first) and a bottom (second) surface of the PCB before assembly. A third step 930 includes inserting the PCB into a mechanical slot of modular antenna structure, wherein the mechanical holes of the PCB lock in with ribs of the mechanical slot of the modular antenna structure, providing alignment of the plurality of spring clips of the PCB with conductive pads of the modular antenna structure, wherein when inserting the PCB along the mechanical slot, tips of the plurality of spring clips are deformed ensuring equilibrium of force on the PCB. A fourth step 940 includes placing the PCB and the modular antenna structure within the curved temple arm of multiple shape and SKU sizes of an electronic eyewear.

While the described embodiments include the shape and size of the eyewear housing varying from one electronic eyewear to another while the size and shape of the PCB and the modular antenna structure being configured to be the same for the variable different shapes and size of the eyewear housing, at least some embodiments are not necessarily constrained to satisfy these features. That is, more generally, for an embodiment, the modular eyewear assembly includes an eyewear housing, a printed circuit board, and a modular antenna structure. The eyewear housing includes a front frame and a pair of eyewear temple arms. The printed circuit board (PCB) includes a controller and a radio, wherein the PCB extends along at least one of the temple arms. The antenna structure interfaces with the PCB for providing a wireless propagation path for the radio. The modular antenna structure further includes a conductive patch formed on a first surface of the modular antenna structure, a conductive side wall that extends through the modular antenna structure, a ground plane formed on a second surface of the modular antenna structure, and a feeding trace located on the first surface which is capacitively coupled to an RFIC (radio frequency integrated circuit) of the PCB, wherein the conductive patch, the conductive sidewall, the ground plane, and the feeding trace form a planar inverted-F antenna.

For at least some embodiments, the planar inverted-F antenna is connected to a ground plane of the PCB through two conductive clips, wherein the two conductive clips are configured to create ground shielding that reduces radiation to a head of a user of the modular eyewear antenna assembly. For at least some embodiments, the planar inverted-F antenna is configured to generate an antenna pattern having a a null radiation pattern in a direction of a head of a user of the eyewear housing. For at least some embodiments, the planar inverted-F antenna is terminated on the PCB with a reactive capacitance.

Although specific embodiments have been described and illustrated, the embodiments are not to be limited to the specific forms or arrangements of parts so described and illustrated. The described embodiments are to only be limited by the claims.

What is claimed:

1. A modular eyewear antenna assembly, comprising:
   an eyewear housing comprising a front frame and a pair of eyewear temple arms, wherein a physical size and shape of each of the temple arms is selectable from a plurality eyewear assembly sizes and shapes;
   a printed circuit board (PCB), wherein the PCB extends along at least one of the temple arms, wherein the PCB has a fixed size that is adapted for placement within the at least one of the temple arms for each of the eyewear assembly sizes and shapes; and
   a modular antenna structure comprising a planar antenna, wherein the modular antenna structure interfaces with the PCB for providing a wireless propagation path for the radio to an external wireless device, wherein the modular antenna structure has a fixed size that is adapted for placement along with the PCB within the at least one of the temple arms for each of the eyewear assembly sizes and shapes;
   wherein the modular antenna structure comprises an inner portion and an outer portion, wherein the PCB is sandwiched between the inner portion and the outer portion when assembled within the at least one of the temple arms for each of the eyewear assembly sizes and shapes.

2. The assembly of claim 1, wherein the PCB comprises a planar structure, and wherein the outer portion of the modular antenna structure comprises a curved surface adapted for placement between the PCB and a curved surface of the at least one of the temple arms for each of the eyewear assembly sizes and shapes.

3. The assembly of claim 2, wherein the curved surface of the modular antenna structure conforms to an inner surface of the temple arm, thereby allowing a volume of an antenna formed by the modular antenna structure to be large enough that the formed antenna is operable to support radiation of electromagnetic signals having a required frequency channel bandwidth.

4. The assembly of claim 1, wherein the modular antenna structure comprises an antenna carrier that includes a mechanical slot formed between the outer portion and the inner portion, wherein the mechanical slot is adapted to receive the PCB.

5. The assembly of claim 4, wherein the mechanical slot forms a sandwich-shaped mechanical structure, and wherein a width of the mechanical slot is dimensioned to provide a fit of a tilt of the PCB along with spring clips located on both sides of the PCB.

6. The assembly of claim 4, wherein the mechanical slot formed between the outer portion and the inner portion of the modular antenna structure includes a rib operative to hook the PCB upon receiving the PCB into the mechanical slot.

7. The assembly of claim 4, wherein the PCB further comprises one or more mechanical holes for aligning the modular antenna structure with the PCB, wherein the mechanical holes lock in with the ribs of the mechanical slot of the modular antenna structure, providing alignment of a plurality of spring clips of one of the PCB and the modular antenna structure with conductive pads of the other of the PCB and the planar antenna module.

8. The assembly of claim 7, wherein the plurality of spring clips is soldered onto both a top and a bottom surface of the PCB before assembly, wherein when assembled by inserting the PCB along the mechanical slot, tips of the plurality of spring clips are deformed ensuring equilibrium of force on the PCB.

9. The assembly of claim 1, wherein the modular antenna structure forms a planar inverted-F antenna which is configured to generate an antenna pattern having a null radiation pattern in a direction of a head of a user of the eyewear housing.

10. The assembly of claim 9, wherein the planar inverted-F antenna is terminated on the PCB with a reactive capacitance.

11. The assembly of claim 9, wherein the modular antenna structure further comprises a conductive patch formed on a first surface of the modular antenna structure, a conductive side wall that extends through the modular antenna structure, a ground plane formed on a second surface of the modular antenna structure, and a feeding trace located on the first surface which is capacitively coupled to an RFIC (radio frequency integrated circuit) of the PCB, wherein the conductive patch, the conductive sidewall, the ground plane, and the feeding trace form the planar inverted-F antenna.

12. The assembly of claim 11, wherein the conductive patch includes an L-shaped cutout that allows for a reduced size of the conductive patch, thereby allowing for a reduction in a size of the planar inverted-F antenna.

13. The assembly of claim 11, wherein the planar inverted-F antenna is connected to a ground plane of the PCB through two conductive clips, wherein the two conductive clips create ground shielding that reduces radiation to a head of a user of the modular eyewear antenna assembly.

14. The assembly of claim 11, further comprising a conductive tuning clip operative to electrically connect the radio to the modular antenna structure, wherein the tuning clip tunes a lower frequency band of electromagnetic signals radiating from the planar inverted-F antenna.

15. The assembly of claim 14, wherein the planar inverted-F antenna operates to form at least three communication modes, wherein each of the three communication modes support wireless communication through the planar inverted-F antenna.

16. The assembly of claim 15, wherein a frequency response of the first mode is selected based on the conductive patch, the conductive ground, the tuning clip, a first ground spring clip between the PCB and the conductive ground located proximate to the tuning clip, and a second spring clip between the PCB and the conductive ground located proximate to a feeding trace signal clip.

17. The assembly of claim 15, wherein a frequency response of the second mode is selected based on the conductive ground 530 on the second surface of the modular carrier, the first ground spring clip, the second spring clip 640, and a third ground spring clip 670.

18. The assembly of claim 15, wherein a frequency response of the third mode is selected based on the feeding trace, a feeding trace signal clip, and GND clips on a first surface of the PCB.

19. The assembly of claim 15, wherein the tuning clip is terminated with termination surface mounted technology (SMT) components on the PCB.

* * * * *